United States Patent
Munaganuru

(10) Patent No.: US 11,513,777 B2
(45) Date of Patent: *Nov. 29, 2022

(54) AUTOMATIC TRANSLATION OF COMPUTER CODE

(71) Applicant: PayPal, Inc., San Jose, CA (US)

(72) Inventor: Subra Munaganuru, San Ramon, CA (US)

(73) Assignee: PAYPAL, INC., San Jose, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/129,370

(22) Filed: Dec. 21, 2020

(65) Prior Publication Data

US 2021/0208858 A1 Jul. 8, 2021

Related U.S. Application Data

(63) Continuation of application No. 16/232,998, filed on Dec. 26, 2018, now Pat. No. 10,877,737.

(51) Int. Cl.
*G06F 8/41* (2018.01)
*G06F 16/22* (2019.01)
*G06F 16/242* (2019.01)

(52) U.S. Cl.
CPC .......... *G06F 8/427* (2013.01); *G06F 16/2282* (2019.01); *G06F 16/2428* (2019.01); *G06F 16/2433* (2019.01)

(58) Field of Classification Search
USPC ........................................................ 717/136
See application file for complete search history.

(56) References Cited

U.S. PATENT DOCUMENTS

| 6,981,207 B1* | 12/2005 | Bakman | G06F 40/174 |
| | | | 715/210 |
| 7,467,163 B1 | 12/2008 | Dodds et al. | |
| 7,797,151 B2 | 9/2010 | Apte et al. | |
| 8,656,356 B2* | 2/2014 | Roy | G06F 8/75 |
| | | | 717/136 |
| 2006/0059459 A1* | 3/2006 | Grimaldi | G06F 40/186 |
| | | | 717/109 |
| 2006/0074942 A1* | 4/2006 | Shaburov | G06F 16/217 |
| 2006/0277531 A1* | 12/2006 | Horwitz | G06F 8/75 |
| | | | 717/137 |
| 2008/0306986 A1 | 12/2008 | Doyle, Sr. | |

(Continued)

OTHER PUBLICATIONS

"HyperSQL"; IzzySoft Github page (github.com/IzzySoft) [full URL in ref.]; 2016 (Year: 2016).*

(Continued)

*Primary Examiner* — Qing Chen
*Assistant Examiner* — Clint Thatcher
(74) *Attorney, Agent, or Firm* — Haynes and Boone, LLP

(57) ABSTRACT

One or more lines of computer code are accessed. An electronic dictionary file is retrieved in response to the accessing of the computer code. The electronic dictionary file contains definitions for a plurality of commands or terms associated with the one or more lines of computer code. Based on the definitions contained in the electronic dictionary file, the one or more lines of computer code are parsed. An output is generated based on the parsing of the computer code. The output contains information explaining the one or more lines of computer code or an intended result of an execution thereof.

20 Claims, 10 Drawing Sheets

(56) References Cited

U.S. PATENT DOCUMENTS

| | | | |
|---|---|---|---|
| 2009/0178031 A1* | 7/2009 | Zhao | G06F 8/427 |
| | | | 717/143 |
| 2010/0146491 A1 | 6/2010 | Hirano et al. | |
| 2015/0019593 A1 | 1/2015 | Kaufman et al. | |
| 2015/0205603 A1 | 7/2015 | Araya et al. | |
| 2016/0124722 A1 | 5/2016 | Mathew et al. | |
| 2017/0212731 A1 | 7/2017 | Beck et al. | |

OTHER PUBLICATIONS

"Convert HTML to Image"; pdfcrowd.com website; Nov. 30, 2018.
"Javadoc Support in NetBeans"; Oracle.com clog page; Apr. 26, 2005.
Smith, Jeff, "JAVADOC for the Oracle Database a la DBDOC"; thatjeffsmith.com website; Mar. 20, 2012.
"Accessing and Using the Javadocs"; screenstepslive.com website as captured by the Wayback Machine Internet Archive (archive.org) Nov. 17, 2018.
"System Class Javadoc Example"; Oracle.com website as captured by the Wayback Machine Internet Archive (archive.org) on Sep. 9, 2018.

\* cited by examiner

FIG. 3

- 🏠 Home (Beta)
- 🎨 BI Landscape
- ▦ Site DB (Beta)
- ▦ DW Models
- ▭ Bookmarks
- 🏷 Tags
- ⚙ KPIs
- ⚙ Configure  +
- 📈 Analysis  +
- ✥ Rationalize
- 🐞 SQL Query Spy
- ⇌ Data Junction 🐞 Query Spy

```
select
 a.cal_dt,
 a.rcvr_cntry_code,
 a.sndr_cntry_code,
 a.rcvr_id,
 a.is_pmt_xbdr_y_n,
 sum(a.ntpv_usd_amt*0.75) as nTPV_Local,
 a.cal_dt(FORMAT'MMM') (CHAR(3)) as MonthName,
 a.cal_dt(FORMAT'YYYY') (CHAR(4)) as YearName,
 b.prmry_flow
from pp_discovery_views.FACT_PAYMENT_DETAIL as a
 inner join pp_discovery_views.dim_payment_flow as b
 on a.pmt_flow_key=b.pmt_flow_key
```

Query Details     Query Spy—270

📥 Download—280

| DIM_PAYMENT_FLOW | | |
|---|---|---|
| SNDR_CNTRY_CODE | Country of primary residence of the sender as of the day of initiation of the payment transaction. Joins to dim_cntry table. | |
| IS_PMT_XBDR_Y_N | A Y/N Y field – Y represents that the transaction is cross border | |
| PRMRY_FLOW | Hierarchy labels as part of Payment Flow revision Phase 2., rolls up to Flow Family | |
| PMT_FLOW_KEY | PK | Report Issues |

FIG. 4B

| FIG. 4A |
|---|
| FIG. 4B |

KEY TO
FIG. 4

Columns in DIM_PAYMENT_FLOW 350

| Code | Comment | Data Type |
|---|---|---|
| pmt_flow_key | PK | |
| busn_line_key | The business line Key.Joins to dim_pmt_flow_busn_line to get the busn_line description | |
| busn_line | The highest level of grouping as part of Payment Flow revision Phase 2. We currently want to categorize all the payments either as Merchant Services or MarketPlaces. VALUES: Merchant Services / MarketPlaces; | |
| busn_seg_key | The business segment key.Joins to dim_pmt_flow_busn_seg to get the busn_seg description | |
| busn_seg | It is the next hierarchy grouping after business line. Consumer related transactions rolls up either under MS or MP Business line. VALUES: Merchant Services / MarketPlaces / Consumer; | |
| flow_fmly_key | The flow family key.Joins to dim_pmt_flow_flow_fmly to get the flow_fmly description | |
| flow_fmly | Hierarchy labels as part of Payment Flow revision Phase 2., rolls up to Business segment | |
| prmry_flow_key | The primary flow key.Joins to dim_pmt_flow_prmry_flow to get the prmry_flow description | |

FIG. 5A

| | |
|---|---|
| prmry_flow | Hierarchy labels as part of Payment Flow revision Phase 2, rolls up to Flow Family |
| sub_flow_key | The sub flow key.Joins to dim_pmt_flow_sub_flow to get the sub_flow description |
| sub_flow | Hierarchy labels as part of Payment Flow revision Phase 2, rolls up to Sub Flow |
| alt_sub_flow_key | The alternate sub flow key.Joins to dim_pmt_flow_alt_sub_flow to get the alt_sub_flow description |
| alternate_sub_flow_rollup | All related subflows irrespective of their business segments as part of Payment Flow revision Phase 2 have been rolled under alternate sub flow. |
| alt_prod_rollup_key | Alternate Product Type Key |
| alt_prod_rollup_desc | Alternate Product Type DEsription |
| old_busn_line | The highest level of grouping as part of older Payment Flow implementation. We currently want to categorize all the payments either as Merchant Services or MarketPlaces. |

FIG. 5B

| |
|---|
| FIG. 5A |
| FIG. 5B |

KEY TO
FIG. 5

AUTOMATIC TRANSLATION OF COMPUTER CODE

RELATED APPLICATIONS

This application is a continuation of U.S. application Ser. No. 16/232,998 filed Dec. 26, 2018, and entitled "Automatic Translation of Computer Code," which is incorporated herein by reference in its entirety

BACKGROUND

Technical Field

The present disclosure generally relates to computer programming language, and more particularly, to automatically translating machine-readable programming code.

Related Art

The field of computer programming has made rapid advances in recent years. However, raw computer code may still seem daunting to a layperson who is not well-versed in computer technologies. For example, when raw computer code is presented to a person who has no computer programming skills, the person may have no idea what the purpose and/or functionality of the computer code entails, or what would happen when the computer code is executed. The same may hold true even for experienced computer programmers, if the experienced programmers are presented with raw computer code written in a computer language or a software tool with which they are not familiar. Even for computer programmers who understand the computer programming language in which the computer code is written, it is still an arduous task to sort through the raw computer code written by others to gain an understanding thereof. In some situations, even if the raw computer code is written by a computer programmer himself/herself, it may still take him/her some time to refamiliarize with the raw computer code to understand what the execution of the raw computer code is supposed to accomplish. As such, what is needed is a tool that can automatically translate existing computer code into an output that is more easily understood by laypeople and experienced programmers alike.

BRIEF DESCRIPTION OF THE DRAWINGS

FIGS. 2-3 and 4A-4B illustrate different portions of a graphical user interface through which computer code may be parsed and the results of the parsing may be displayed according to various aspects of the present disclosure.

FIGS. 5A-5B illustrate an electronic dictionary file according to various aspects of the present disclosure.

DETAILED DESCRIPTION

Figure 1:
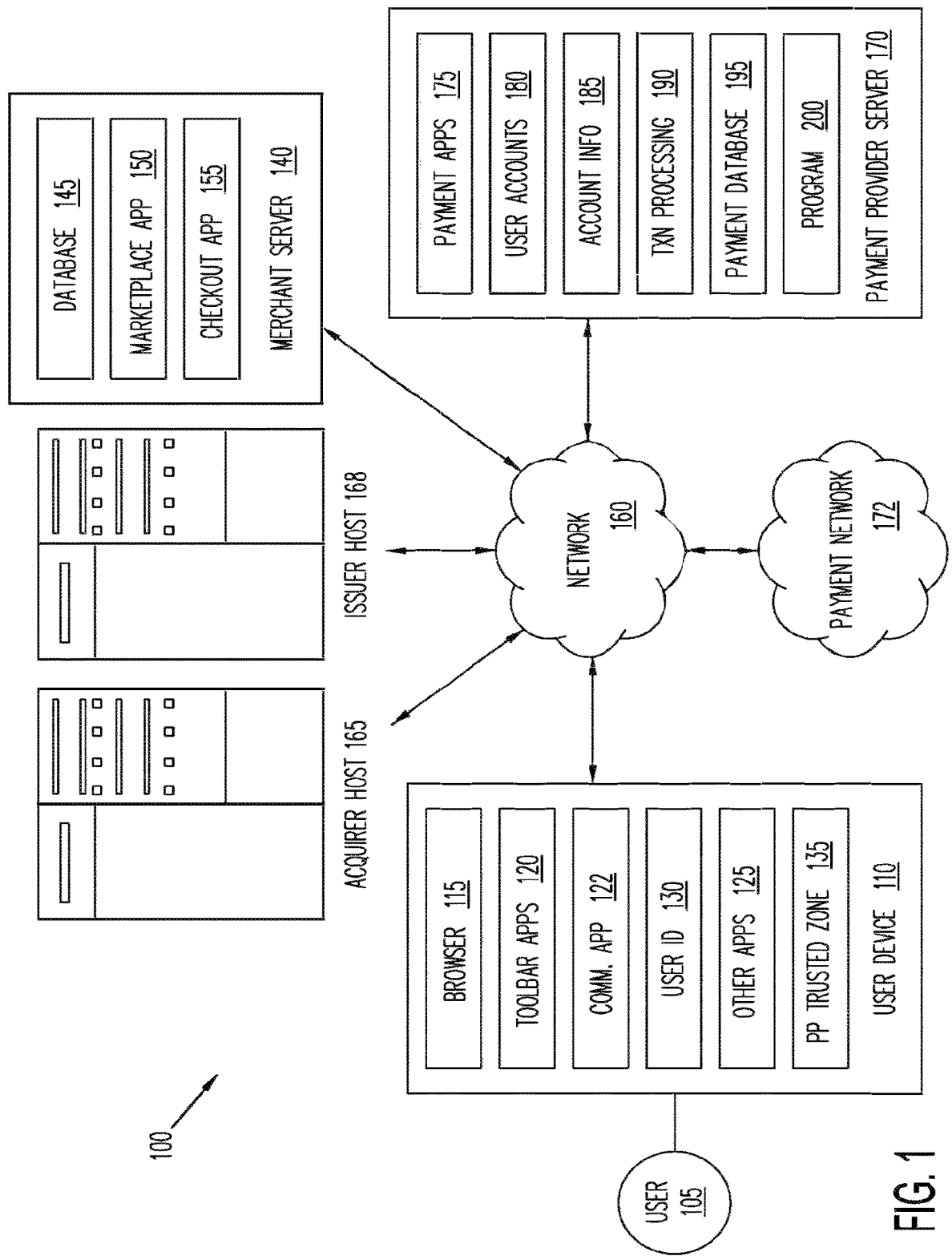
FIG. 1 is a simplified block diagram of a networked system according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As computer technologies continue to evolve, the field of computer programming has become more complex and daunting. For example, new types of computer software tools are constantly being developed and rolled out in the market place. In many cases, each type of computer software tool may be written in a type of computer code (e.g., a specific type of computer programming language) that is tailored for the software tool. Since the development of computer software requires computer programmers who are well-versed in the computer programming language, the proliferation of different types of software tools makes it more difficult to locate a competent computer programmer who can understand and work with a large number of computer software tools. As such, a problem that is unique to the field of computer technologies may arise: even an otherwise competent computer programmer may have trouble understanding a particular type of computer code, if he/she lacks experience in working with that particular type of computer code. This lack of understanding can hinder the effectiveness or efficiency of the user, such as determining an incorrect purpose or functionality of the code or spending both time and resources to figure out what the code is meant to do and how the code does it. In addition, if a first computer programmer is inheriting a project where the computer code was written by a second computer programmer who is different from the first programmer, then the first computer programmer may still have trouble understanding the computer code even if the computer code was written in a programming language that the first computer programmer is familiar with. In some cases, even if the computer code had been written by the computer programmer himself/herself, the computer programmer may still find it difficult to recall the original intent for the computer code, or what an execution of the computer code will accomplish. These problems are exacerbated when the computer code becomes more "machine-like" and resembles human languages less.

The present disclosure overcomes the problems discussed above by implementing a computer application that receives computer code from a user and then automatically generates an output containing information that explains the meaning behind the computer code and/or what the execution of the computer code will or is intended to accomplish. For example, the output may be generated in the form of a table that is presented via a graphical user interface on a computing device. The table contains information regarding the meaning of various commands or computer terms of the code, and/or the expected result of the execution the computer code. The automatic generation of the output may involve accessing an electronic dictionary file that includes definitions for a plurality of commands associated with the computer code and parsing the computer code based on the electronic dictionary file. In some embodiments, the dictionary file may include a Hypertext Markup Language (HTML) file. In some embodiments, the computer code includes computer code for programming or operating an electronic database, such as Structured Query Language (SQL) code.

As summarized above and discussed in more detail below, the present disclosure is integrally tied to specific technology environments (e.g., computer code parsing and translation). The present disclosure also improves the functionality of a computer via the implementation and execution of a computer application to effectively translate hard-to-understand computer code into a result that is more easily understood by human users, particularly for human users who lack computer programming experience and/or who is not the author of the computer code. This can include a more efficient use of the computer due to programmers being able to better understand what specific codes are meant to do and how they do it, so that the computer is less likely to be used to run incorrect code due to the user not understanding the earlier code. The various aspects of the present disclosure will be discussed below in more detail with reference to FIGS. 1-8.

FIG. 1 is a block diagram of a networked system 100 suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or another suitable server-based OS. It can be appreciated that the servers illustrated in FIG. 1 may be deployed in other ways and that the operations performed, and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PAYPAL™, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that a transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., a tablet computer, a wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and/or services.

Still referring to FIG. 1, the user device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

In conjunction with user identifiers 130, user device 110 may also include a trusted zone 135 owned or provisioned by the payment service provider with agreement from a device manufacturer. The trusted zone 135 may also be part of a telecommunications provider SIM that is used to store appropriate software by the payment service provider capable of generating secure industry standard payment credentials as a proxy to user payment credentials based on user 105's credentials/status m the payment providers system/age/risk level and other similar parameters.

User device 110 may install and execute a payment application received from the payment service provider to facilitate payment processes. The payment application may allow a user to send payment transaction requests to the payment service provider, which includes communication of data or information needed to complete the request, such as funding source information.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, the payment provider server 170 may also include a computer application 200. The computer application 200 is configured to accept one or more lines of computer code, parse the computer code based on an electronic dictionary file, and generate an output that explains the intent or purpose for the computer code, and/or what the execution of the computer code is meant to achieve. In some embodiments, the computer code may be a type of computer code for programming or operating an electronic database, such as SQL code. However, it is understood that the aspects of the present disclosure may apply to other types of computer code (e.g., C++, Java, Python, etc.) as well. In this manner, even a layperson (e.g., a person who does not have much computer programming experience, if at all) may still gain a rudimentary understanding of the computer code. Furthermore, the computer application 200 may help computer programmers in interpreting computer code that is written in a language with which they are not familiar, or computer code written by others (or even themselves).

It is understood that although the embodiment of FIG. 1 illustrates the computer application 200 as residing on the payment provider server 170, this is not intended to be limiting. In some embodiments, the computer application 200 (or a similar tool) may be implemented on the user device 110 or another user device, or another server device. In other embodiments, the computer application 200 may be divided in parts, with some parts being implemented on the payment provider server 170, while other parts are implemented on the user device 110 or another user device or a different server device. Furthermore, although the computer application 200 is illustrated as being separate from the transaction processing application 190 in the embodiment shown in FIG. 1, the transaction processing application 190 may implement some, or all, of the functionalities of the computer application 200 in other embodiments. In other words, the computer application 200 may be integrated within the transaction processing application 190 in some embodiments. The features and functionalities of the computer application 200 will be discussed later in more detail with reference to FIGS. 2-8.

Still referring to FIG. 1, the payment network 172 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
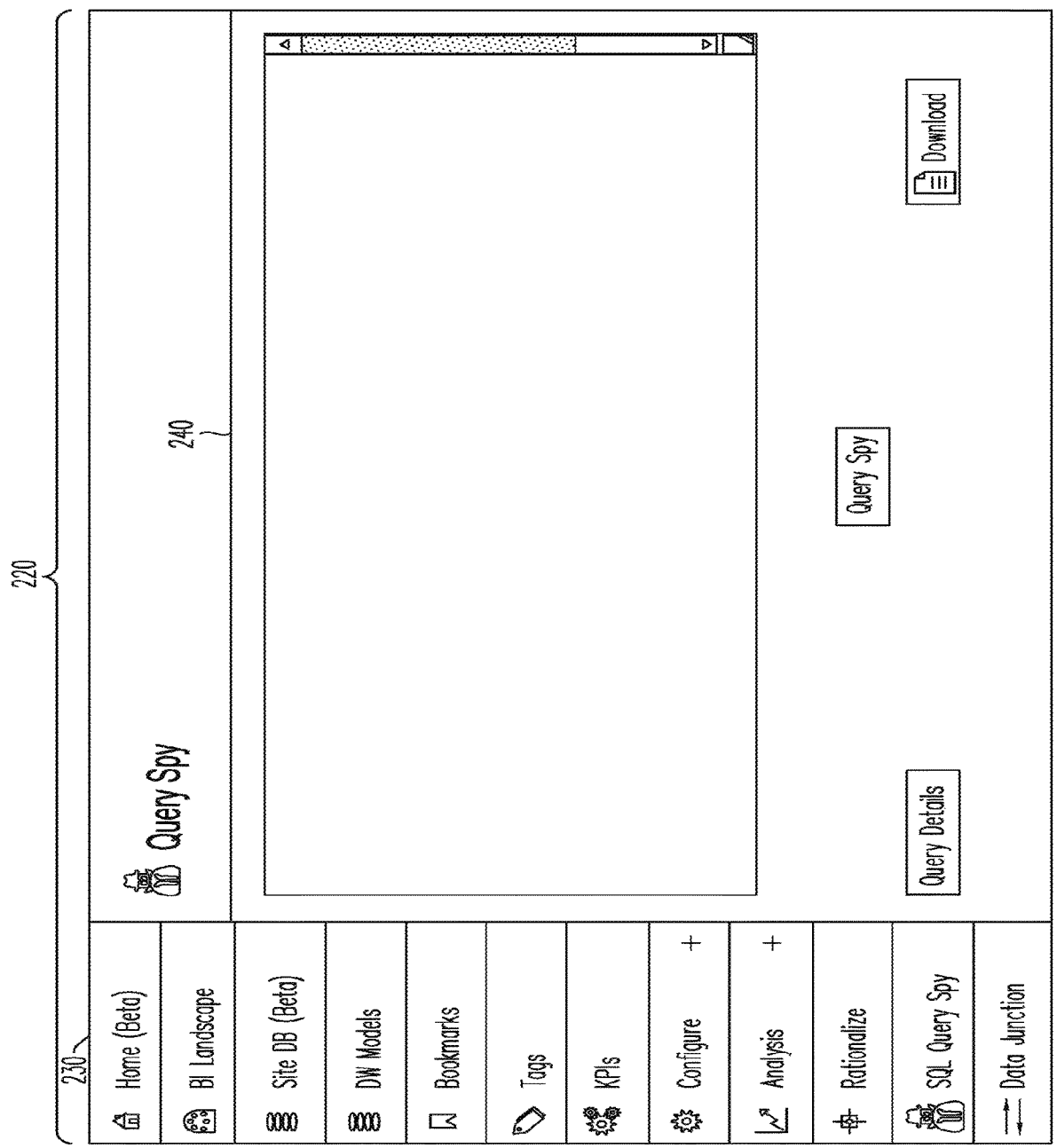

FIG. 2 illustrates an example graphical user interface (GUI) 220 of the computer application 200, which is named Query Spy™ herein as a non-limiting example. The GUI 220 may be displayed via the user device 110, or another suitable computing device such as a desktop computer, a laptop computer, a tablet computer, or a smartphone. The computing device may be a device of a user (e.g., the user 105), or a device of a corporate entity such as a payment provider, a merchant, or an electronic database provider or management company.

The GUI 220 of the computing application 200 displays a plurality of menu options 230 that each have its own functionality. One of the menu options, "SQL QuerySpy", may trigger the display of a window 240 when engaged by the user. The window 240 may initially be blank (such as shown in FIG. 2), but it may be filled in by text. For example, referring now to FIG. 3, the user may copy a plurality of lines of computer code 250 (e.g., from a different computer file on the computing device or via a network connection) and paste the copied computer code 250 into the window 240. As a non-limiting example, the computer code 250 may include code for programming or operating an electronic database, such as the code listed below:

select
a.cal_dt,
a.rcvr_cntry_code,
a.sndr_cntry_code,
a.rcvr_ld,
a.is_pmt_xbdr_y_n,
sum(a.ntpv_usd_amt*0.75) as nTPV_Local,
a.cal_dt(FORMAT 'MMM') (CHAR(3)) as MonthName,
a.cal_dt(FORMAT 'YYYY') (CHAR(4)) as YearName,
b.prmry_flow
from pp_discovery_views.FACT_PAYMENT_DETAIL as a
 inner join pp_discovery_views.dim_payment_flow as b
 on a.pmt_flow_key=b.pmt_flow_key
where
a.cal_dt between '2018-12-11' and current_date-2
and a.is_pmt_official_y_n ='Y'
and a.rcvr_cntry_code='MX'
group by a.cal_dt, a.rcvr_cntry_code, a.sndr_cntry_code, a.rcvr_ld, b.prmry_flow,a.is_pmt_xbdr_y_n;

Due to the size of the window 240, only a portion of the computer code 250 may be shown therein, but the user may manipulate a scroll bar 260 to go "up" or "down" within the window 240 to view other portions of the computer code 250. In any case, the computer code 250 may appear daunting to a layperson, or even to an experienced computer programmer who lacks familiarity with SQL code programming. Thus, a layperson or even an experienced computer programmer may have difficulty understanding the purpose of the computer code 250, or what the execution of the computer code 250 entails.

Figure 4A:
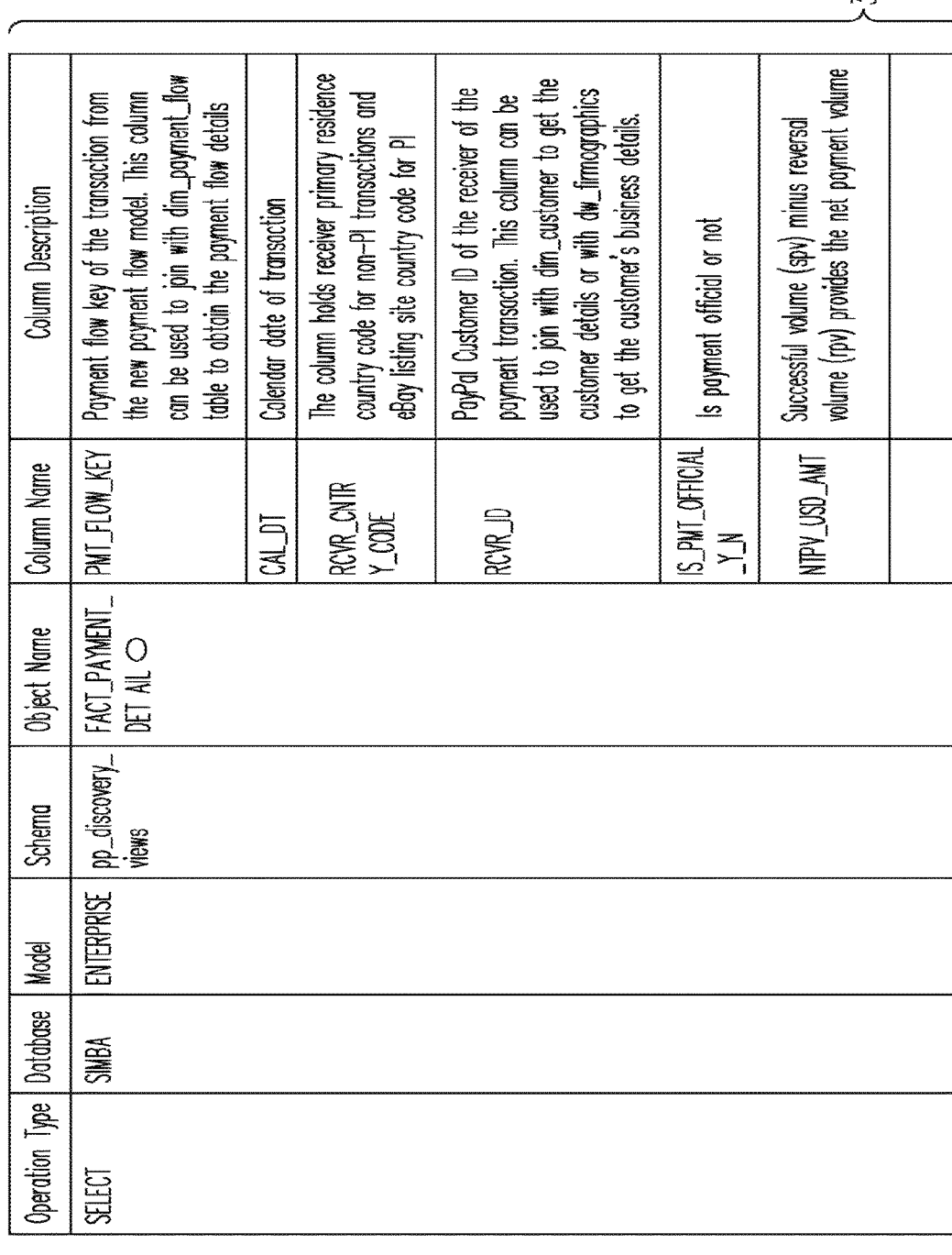

The present disclosure solves this problem by automatically translating the computer code 250 into something that is easier to understand for laypeople and experienced programmers alike. For example, the user may click on a "Query Spy" button 270 to initiate the automatic translation of the computer code 250. The output of the automatic translation may be accessible via a click of a "Download" button 280. The contents of the output are shown in FIGS. 4A-4B as a non-limiting example. As shown in FIGS. 4A-4B, the contents of the output of the automatic translation of the computer code 250 may be displayed via the GUI 220 in the format of a table 300. In some embodiments (such as in the embodiment shown), the table 300 may be displayed "below" the window 240. In other embodiments, the table 300 may be displayed as a separate file altogether, for example, as a pop-up, a pdf file, a word file, an excel file, etc.

The table 300 may include a plurality of sections, for example the sections can include "Operation Type", "Database", "Model", "Schema", "Object Name", "Column Name", and "Column Description." The section "Operation Type" may list a plurality of different types of query operations, such as "SELECT". Other example query operations may include "INSERT", "DELETE", "UPDATE", etc. The section "Database" may list the target database (e.g., a database named "SIMBA") for which the operation (e.g., "SELECT" herein) is performed.

Each database may include a plurality of different models. For example, all customer related worksheets may be in one model, while information related to marketing could be in another model, etc. In the table 300, the section "Model" lists the specific model (e.g., a model with the name "ENTERPRISE") within the database for which the operation is performed. In addition, each model may include a plurality of different schemas. Schemas may be similar to models, but the schemas may refer to physical models, whereas the models may refer to logical models. In some embodiments, the schemas and the models may be grouped together, though they are separated into different sections in the illustrated embodiment. The table 300 lists "pp_discovery_views" as the schema for the model "ENTERPRISE".

With each schema (or model, if schemas and models are merged), there may be a plurality of objects, each of which having its own "Object Name". An object may be a name of a database table. For example, the table 300 lists "FACT_PAYMENT_DETAIL" and "DIM_PAYMENT_FLOW" as the object names of the schema "pp_discovery_views". "FACT_PAYMENT_DETAIL" and "DIM_PAYMENT_DETAIL" may be database tables, which contain multiple columns. In other words, each object may include a plurality of columns, each of which having its own "Column Name". For example, for the object name FACT_PAYMENT_DETAIL, the table 300 lists "PMT_FLOW_KEY", "CAL_DT", "RCVR_CNTRY_CODE", "RCVR_ID", "IS_PMT_OFFICIAL_Y_N", "NTPV_USD_AMD", "SNDR_CNTRY_CODE", and "IS_PMT_XBDR_Y_N" as the column names. For the object name DIM_PAYMENT_FLOW, the table 300 lists "PRMRY_FLOW" and "PMT_FLOW _KEY" as the column names. In some embodiments, each column may contain a single data point like a date or a number, whereas a table may contain multiple columns pertaining to an object. In other embodiments, the columns may reflect, or correspond to, various types of computer commands or terms that are present in any given computer programming language (e.g., SQL code in this case as a non-limiting example).

The table 300 explains the meaning behind each "Column name" in the section "Column Description". For example, the column "PMFT_FLOW_KEY" is described as a payment flow key of the transaction from the new payment flow model. This column can be used to join with dim_payment_flow table to obtain the payment flow details. The column "CAL DT" is described as a calendar date of transaction.

The column "RCVR_CNTRY_CODE" is described as the column that holds receiver primary residence country code for non-PI transactions and eBay listing site country code for PI. The column "RCVR_ID" is described as a PayPal customer ID of the receiver of the payment transaction. This column can be used to join with dim_customer to get the customer details or with dw_firmographics to get the customer's business details. The column "IS_PMT_OFFI-CIAL_Y_N" is described as a determination of whether the payment is official or not. The column "NTPV_USD_AMD" is described as a successful volume (spv) minus reversal volume (rpv) to provide the net payment volume. The column "SNDR_CNTRY_CODE" is described as a country of primary residence of the sender as of the day of initiation of the payment transaction. This column joins to dim_cntry table. The column "IS_PMT_XBDR_Y_N" is described as a Y/N (e.g., yes or no) field, where Y represents that the transaction is cross border. The column "PRMRY_FLOW" is described as hierarchy labels as part of Payment Flow revision Phase 2, rolls up to Flow Family. The column "PMT_FLOW_KEY" is described as a PK.

The column descriptions provide intuitive and easy-to-comprehend explanations to the meaning or intent behind each of the column names. For example, the column descriptions contain definitions for a plurality of esoteric commands or terms in a given computer programming language. The column descriptions also explain the expected result of an execution for at least some of these commands or terms, and thus the result of the overall execution the computer code 250. Whereas the computer code 250 contains very few words or phrases in plain English, the table 300 includes a great number of words and/or phrases in plain English, particularly in the section "Column Description." As such, the user—whether he/she is a layperson or an experienced computer programmer—can more easily understand the original purpose of the computer code 250, and/or what the execution of the computer code 250 will entail. It is understood that the different types of operations, databases, models, schemas object names, and column names are merely non-limiting examples of the various commands and/or terms in any given type of computer code, for example C++ code, Java code, Python code, etc. In other implementations, the table 300 may parse the computer code and automatically generate an output that includes intuitive and easy-to-understand explanations for different types of computer programming commands and/or terms. Hence, the computer application 200 may be a very useful tool to solve a particular problem that arises specifically in a computer technology context, for example by giving plain English (or other types of human languages) meanings to a variety of computer commands and/or terminologies, thereby making esoteric computer code seem less daunting.

In some embodiments, the parsing of the computer code 250 may be performed at least in part using an electronic dictionary file. For example, as shown in FIGS. 5A-5B, an electronic dictionary file 350 may include a Hypertext Markup Language (HTML) file. The electronic dictionary file 350 may contain definitions and/or explanations for a plurality of computer commands or terms in a given type of computer code. For example, the electronic dictionary file 350 includes definitions and/or explanations for the various column names. In other embodiments, the electronic dictionary file 350 may include definitions for commands or terms in other types of computer code, such as C++, Java, Python, etc. It is understood that only a portion of the electronic dictionary file 350 is shown in FIGS. 5A-5B for reasons of simplicity. In any case, the computer application 200 may electronically scan the computer code 250 for a predefined set of commands or terms that are associated with a particular type of computer code, such as SQL code, C++ code, Java code, or Python code, etc. When a match of any one of the commands or terms in the predefined set is discovered by the electronic scanning, the computer application 200 may retrieve the definition for the discovered command or term from the electronic dictionary file. The retrieved definition may then be displayed via the GUI 220, for example through the table 300. As a non-limiting example, the following computer code may be used to access the electronic dictionary file 350 to retrieve the definition of an object:

SELECT DATABASE, MODEL, SCHEMA. OBJECT_ NAME, COLUMN_NAME,
COUJ MN_DESCRIPTION
FROM SCHEMA_DATA
\VHERE
  OBJECT_NAJ'vlE='FACT_PAYMENT_DETAIL';

In the above non-limiting example, the discovered object via electronic scanning is FACT_PAYMENT_DETAIL, but it is understood that the object may change and may include any other object in other examples.

In addition to obtaining the definitions or explanations for the column names from the electronic dictionary file 350, the computer application 200 also obtains information such as the type of operation, name of the database, and name of the model by parsing the computer code 250. For example, the schema "pp_discovery_views" is embedded in the computer code 250. The computer application 200 scans through the computer code 250 to look for various schemas, including the schema "pp_discovery_views". When the term "pp_discovery_views" is found by the computer application 200 during the parsing, it recognizes that this schema is a part of the model "ENTERPRISE", and that the model "ENTERPRISE" is a part of the database "SIMBA." As such, the computer application lists the database and model names "SIMBA" and "ENTERPRISE" in the table 300.

It is understood that although the present disclosure displays the result of the computer code parsing in the format of a table, it is not intended to be limited except where claimed. In other embodiments, the result of the parsing may be shown in another suitable format. It is also understood that the computer application 200 may be housed within a larger platform that includes other functionalities. For example, the larger platform may be a data assist research tool (DART), which is a hub of different types of analytical tools. As an example, the various menu options 230 shown in FIG. 2 may be engaged by a user to access different parts of the DART platform.

Figure 6:
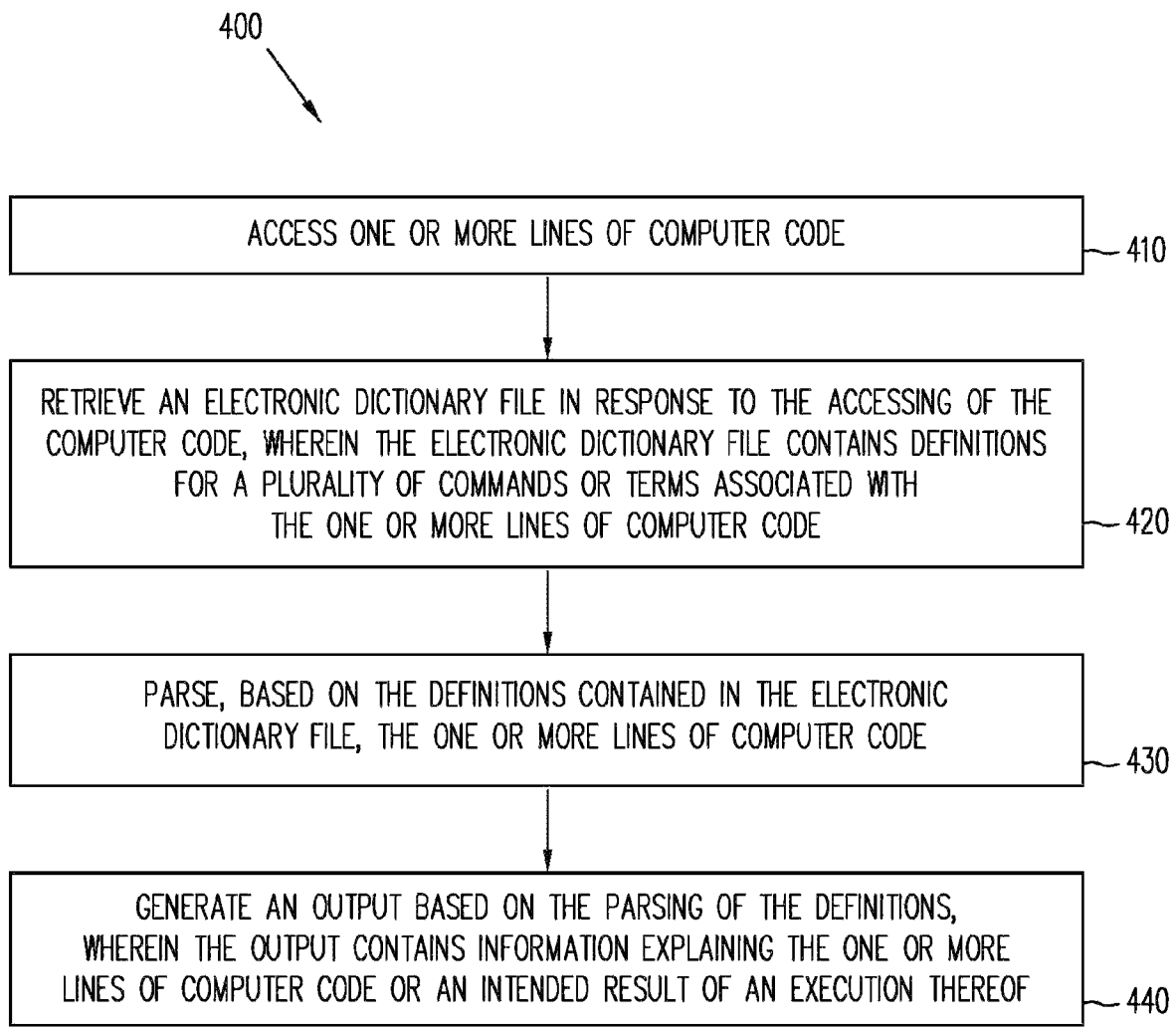
FIG. 6 is a flowchart illustrating a method according to various aspects of the present disclosure.

Referring now to FIG. 6, a flowchart of a method 400 is illustrated. The method 400 describes an example process flow to automatically translate esoteric computer code into a result that is more easily understandable by human users. It is understood that at least one of the steps of the method 400 is performed using one or more hardware electronic processors.

The method 400 includes a step 410 to access one or more lines of computer code in response to a user request to translate the code, such as through selection of Query Spy button discussed above or similar link or button, although in some embodiments, the accessing may be done without a user indicating a request, such as when an entity desires to provide translations proactively to one or more users. Accessing the lines enables the system to determine specific terminology, format, and other details of the code. In some embodiments, the one or more lines of computer code comprises Structured Query Language (SQL) code for electronic database programming.

The method 400 includes a step 420 to retrieve an electronic dictionary file in response to the step 410. The electronic dictionary file contains definitions for a plurality of commands or terms associated with the one or more lines of computer code. In some embodiments, the retrieving the electronic dictionary file comprises retrieving a Hypertext Markup Language (HTML) file.

The method 400 includes a step 430 to parse, based on the definitions contained in the electronic dictionary file, the one or more lines of computer code. For example, the accessed lines may enable the system to determine a specific type of code, a specific intent of the code, a specific use of the code, and other details that may be used to search the electronic dictionary file or specific portions of the electronic dictionary file, which can result in more efficient searching (and less use of computing resources) by only searching parts of the file rather than the entire file. In some embodiments, the step 430 of parsing the computer code comprises electronically scanning the one or more lines of computer code for a predefined set of commands or terms and retrieving a definition for each of the commands or terms discovered in response to the parsing.

The method 400 includes a step 440 to generate an output based on the parsing step of 430. The output contains information explaining the one or more lines of computer code or an intended result of an execution thereof. For example, explanation of a line of code or a portion of code may be based on a simple look up of one or more terms in the code, while an intended result may be based on a sequence of operations associated with the code, e.g., the code is looked at in combination rather than in isolation. In embodiments where a definition is retrieved for each of the commands or terms are discovered in response to the parsing, the output may include presenting the retrieved definition for each of the discovered commands or terms.

In some embodiments, the output is generated as a table, which is displayed via a graphical user interface on a computing device. The information is presented within the table. In some embodiments, the table contains a plurality of sections containing information correspond to: a type of operation performed by a command of the one or more lines of computer code, an electronic database, a model or schema of the electronic database, an object of the model or schema, and a column of the object. In some embodiments, the step 440 of generating the output comprises presenting an intended result of an execution for each of a plurality of types of operations associated with the one or more lines of computer code. In other embodiments, the step 440 of generating the output is performed such that the output contains more words or phrases in a human language than in the one or more lines of computer code.

In some embodiments, the steps 410-440 are performed at least in part by a software application that is housed within an electronic database management platform.

It is understood that additional method steps may be performed before, during, or after the steps 410-440 discussed above. However, these additional steps are not discussed in detail herein for reasons of simplicity.

Based on the above discussions, it can be seen that the present disclosure offers advantages in the area of computer programming languages. It is understood, however, that not all advantages are necessarily discussed in detail herein, different embodiments may offer different advantages, and that no particular advantage is required for all embodiments. One advantage is that the present disclosure enables the task of understanding esoteric computer code to be less daunting. For example, the present application uses a computer application to parse computer code in a given programming language. The result of the parsing contains definitions and/or explanations of computer commands or terms in plain English (or any other type of human language). This allows even a layperson with very little computer programming experience to understand the original intent and purpose of the computer code, and what the execution of the computer code will or should entail. As such, the user may be better able to tweak or revise the code, and if needed, ask another programmer to tweak or revise the code, in order to achieve a desired result without undue use of the computer, such as to run "test" code because the user does not understand the code at issue. This is a specific feature that occurs within the context of computer technology, and the implementation of the computer application results in an improvement of computer technology over a conventional computer. Other advantages may include compatibility with existing systems and low cost of implementation.

Figure 7:
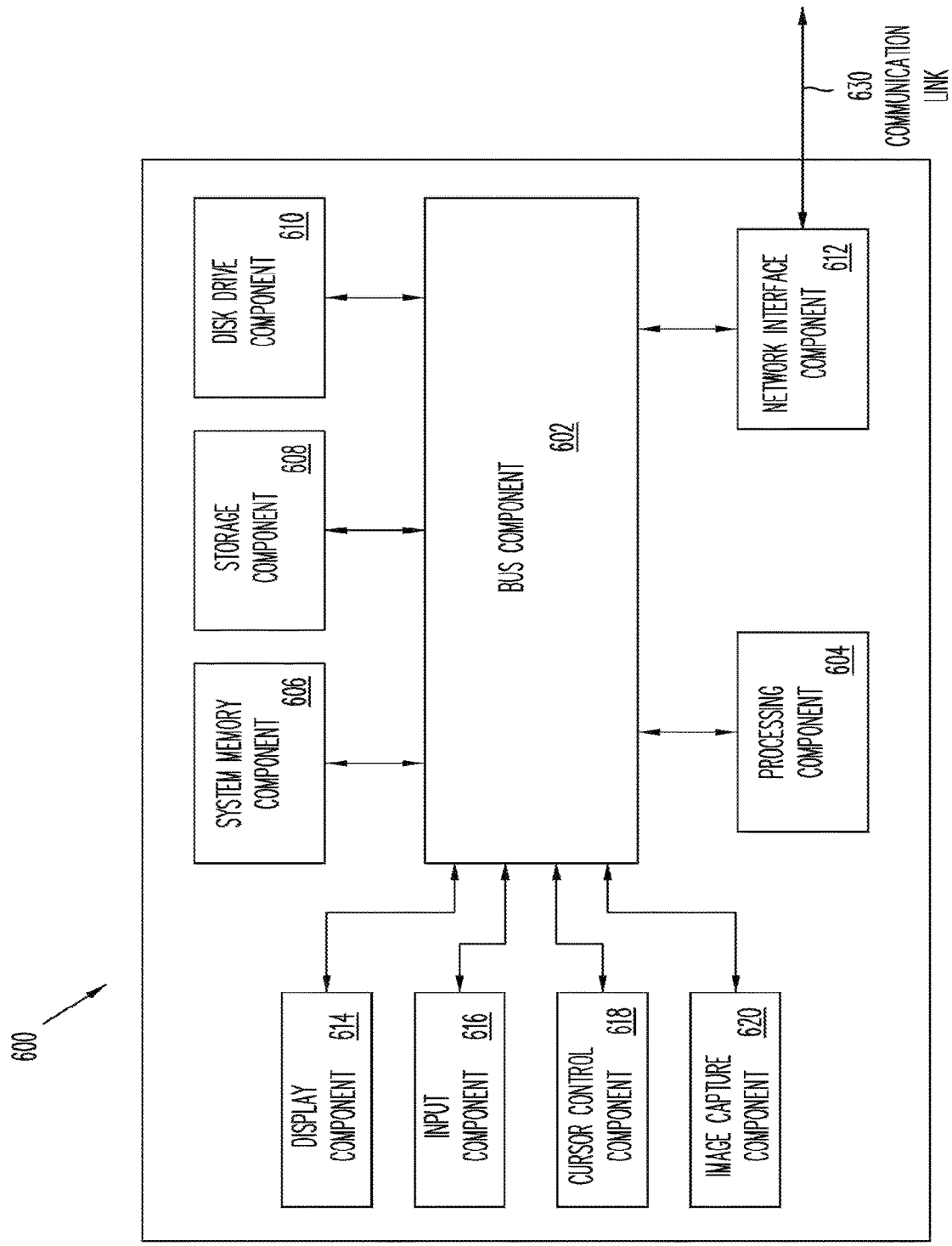
FIG. 7 is an example computer system for implementing the various steps of the method of FIG. 6 according to various aspects of the present disclosure.

FIG. 7 is a block diagram of a computer system 600 suitable for implementing various methods and devices described herein, for example, the various method steps of the method 400. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the method 400 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 8:
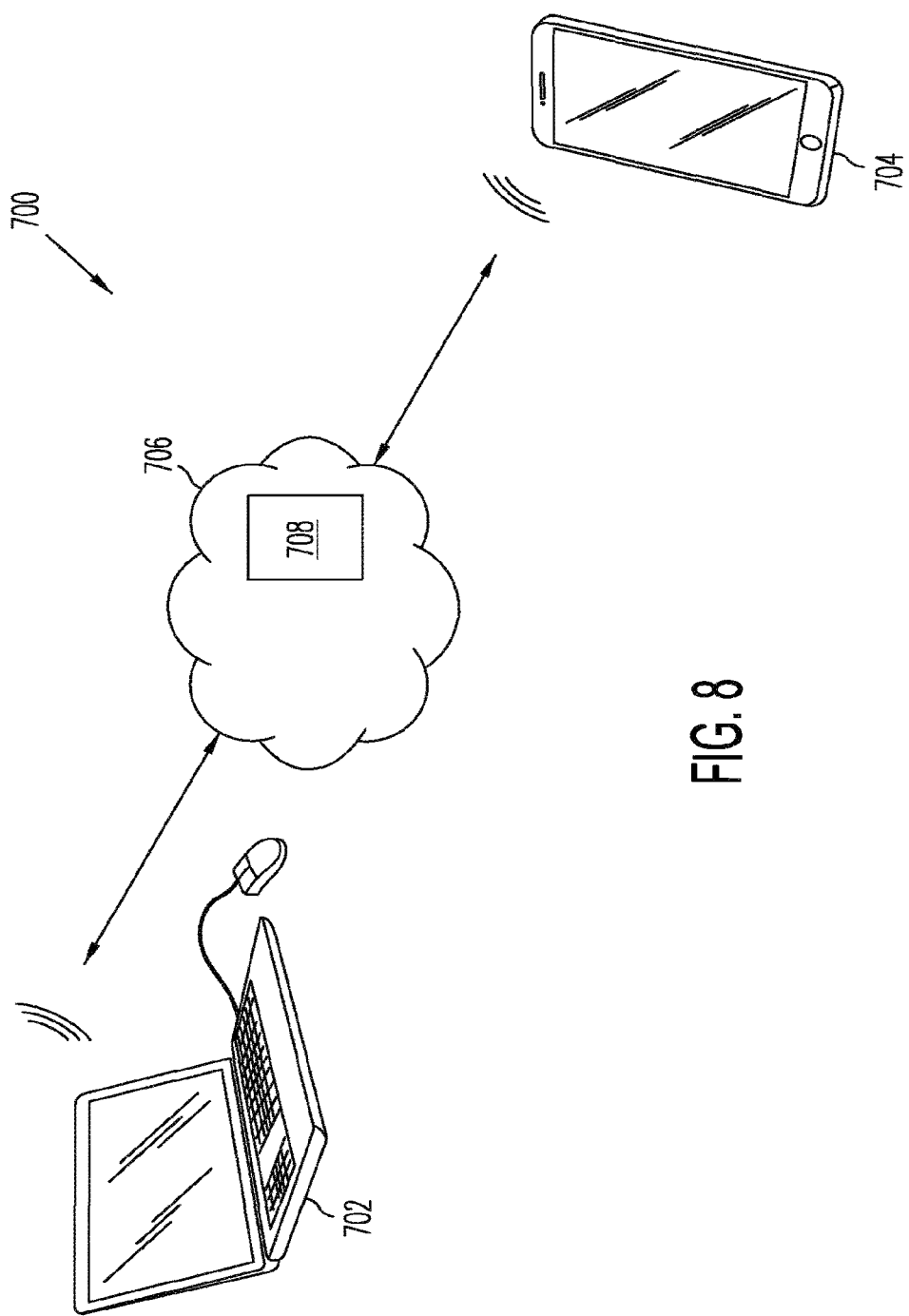
FIG. 8 is a simplified example of a cloud-based computing architecture according to various aspects of the present disclosure.

FIG. 8 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to run software to provide an application with functionalities described above with reference to FIGS. 1-7.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. As another example, the mobile device 704 and the cloud-based resources 708 may work together to execute the steps of the method 400 discussed above. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method. The method includes: accessing one or more lines of computer code; retrieving an electronic dictionary file in response to the accessing, wherein the electronic dictionary file contains definitions for a plurality of commands or terms associated with the one or more lines of computer code; parsing, based on the definitions contained in the electronic dictionary file, the one or more lines of computer code; and generating an output based on the parsing, wherein the output contains information explaining the one or more lines of computer code or an intended result of an execution thereof; wherein at least one of the accessing, the retrieving, the parsing, or the generating is performed using one or more electronic hardware processors.

One aspect of the present disclosure involves a system. The system includes a non-transitory memory and one or more hardware processors coupled to the non-transitory memory and configured to read instructions from the non-transitory memory to cause the system to perform operations comprising: providing a graphical user interface (GUI); receiving, via the GUI and from a user, one or more lines of computer code; detecting, via the GUI, a request from the user to translate the one or more lines of computer code; parsing the one or more lines of computer code in response to the detecting of the request, wherein the parsing includes accessing an electronic dictionary file that contains definitions for a plurality of commands or terms associated with a computer programming language in which the one or more lines of computer code are written; and automatically generating an output based on the parsing, wherein the output contains definitions for one or more commands or terms included in the one or more lines of code.

Yet another aspect of the present disclosure involves a non-transitory machine-readable medium having stored thereon machine-readable instructions executable to cause a machine to perform operations comprising: receiving one or more lines of computer code written in a first computer programming language; detecting a request to translate the one or more lines of computer code; electronically scanning, in response to the detecting of the request, the one or more lines of computer code for a set of computer commands or terms associated with the first computer programming language; obtaining a list of computer commands or terms in response to the electronically scanning; accessing an electronic dictionary file to retrieve definitions or explanations of the list of the computer commands or terms; and displaying an output that includes the retrieved definitions or explanations of the list of the computer commands or terms.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A method, comprising:
   accessing computer code entered from a user device, wherein the computer code comprises a schema name, a model name, and a database name; and
   generating non-Hypertext Markup Language (HTML) output information representing the computer code, wherein the generating includes:
      retrieving an HTML dictionary file usable for associating terms in the computer code with the non-HTML output information; and
      associating, at least in part using the HTML dictionary file, the schema name, the model name, and the database name with one another.

2. The method of claim 1, wherein the HTML dictionary file contains definitions of one or more lines of the computer code or contains explanations of an intended result of an execution of the computer code.

3. The method of claim 1, further comprising:
   parsing the computer code and mapping the parsed computer code to the associated terms in the computer code.

4. The method of claim 1, wherein the HTML dictionary file includes definitions for a plurality of commands associated with the computer code.

5. The method of claim 1, wherein the non-HTML output information is in a form of a table, and
   wherein the table is presented via a user interface on the user device.

6. The method of claim 1, wherein the non-HTML output information is presented on a separate file on the user device.

7. The method of claim 1, wherein the computer code is accessed in response to receiving a request to obtain information regarding the computer code.

8. The method of claim 1, wherein the computer code comprises Structured Query Language (SQL) code.

9. A system comprising:
   a processor; and
   a non-transitory computer-readable medium having stored thereon instructions that are executable by the processor to cause the system to perform operations comprising:
      electronically accessing, at least in part via a computer application implemented on a user device of a user, one or more lines of computer code, wherein the one or more lines of computer code comprise at least a schema name, a model name, and a database name; and
      generating an output representing the received computer code, the output having a non-Hypertext Markup Language (HTML) format, wherein the generating includes:
         retrieving an electronic dictionary file that contains definitions for different terms in the one or more lines of computer code; and
         associating, at least in part using the electronic dictionary file, the schema name, the model name, and the database name with one another.

10. The system of claim 9, wherein the electronic dictionary file further contains explanations regarding an intended result of an execution of the one or more lines of computer code.

11. The system of claim 9, wherein the operations further comprise:
   parsing the one or more lines of computer code and mapping the parsed one or more lines of computer code to the different terms in the one or more lines of computer code.

12. The system of claim 9, wherein the electronic dictionary file is in an HTML format.

13. The system of claim 9, wherein the output is in a form of a table, and wherein the operations further comprise presenting the table via a user interface on the user device.

14. The system of claim 9, wherein the output is presented on a separate file on the user device, the separate file being separate from the computer application.

15. The system of claim 9, wherein the accessing the one or more lines of computer code is performed in response to receiving a request to translate the computer code.

16. The system of claim 9, wherein the one or more lines of computer code comprise Structured Query Language (SQL) code.

17. A non-transitory machine-readable medium having stored thereon machine-readable instructions executable to cause a machine to perform operations comprising:
   receiving, through a computer application, computer code entered through a user device, the computer code comprising a plurality of terms and at least a schema name, a model name, and a database name;
   in response to receiving the computer code, retrieving a Hypertext Markup Language (HTML) dictionary file that contains definitions of the plurality of terms
   linking, at least in part using the HTML dictionary file, the schema name to the model name, and the model name to the database name; and
   generating a non-HTML output based on the linking, the output representing the computer code.

18. The non-transitory machine-readable medium of claim 17, wherein the HTML dictionary file further contains an explanation of an intended result of an execution of the computer code.

19. The non-transitory machine-readable medium of claim 17, wherein the operations further comprise:

parsing the computer code and mapping the parsed computer code to the plurality of terms in the computer code.

20. The non-transitory machine-readable medium of claim 17, wherein the operations further comprise: causing the non-HTML output to be presented via a graphical user interface of the computer application or via a computer file that is separate from the computer application.

* * * * *